Jan. 29, 1952 C. E. LOMAX ET AL 2,583,783
PAY STATION CIRCUITS FOR AUTOMATIC TELEPHONE SYSTEMS
Filed Feb. 3, 1948
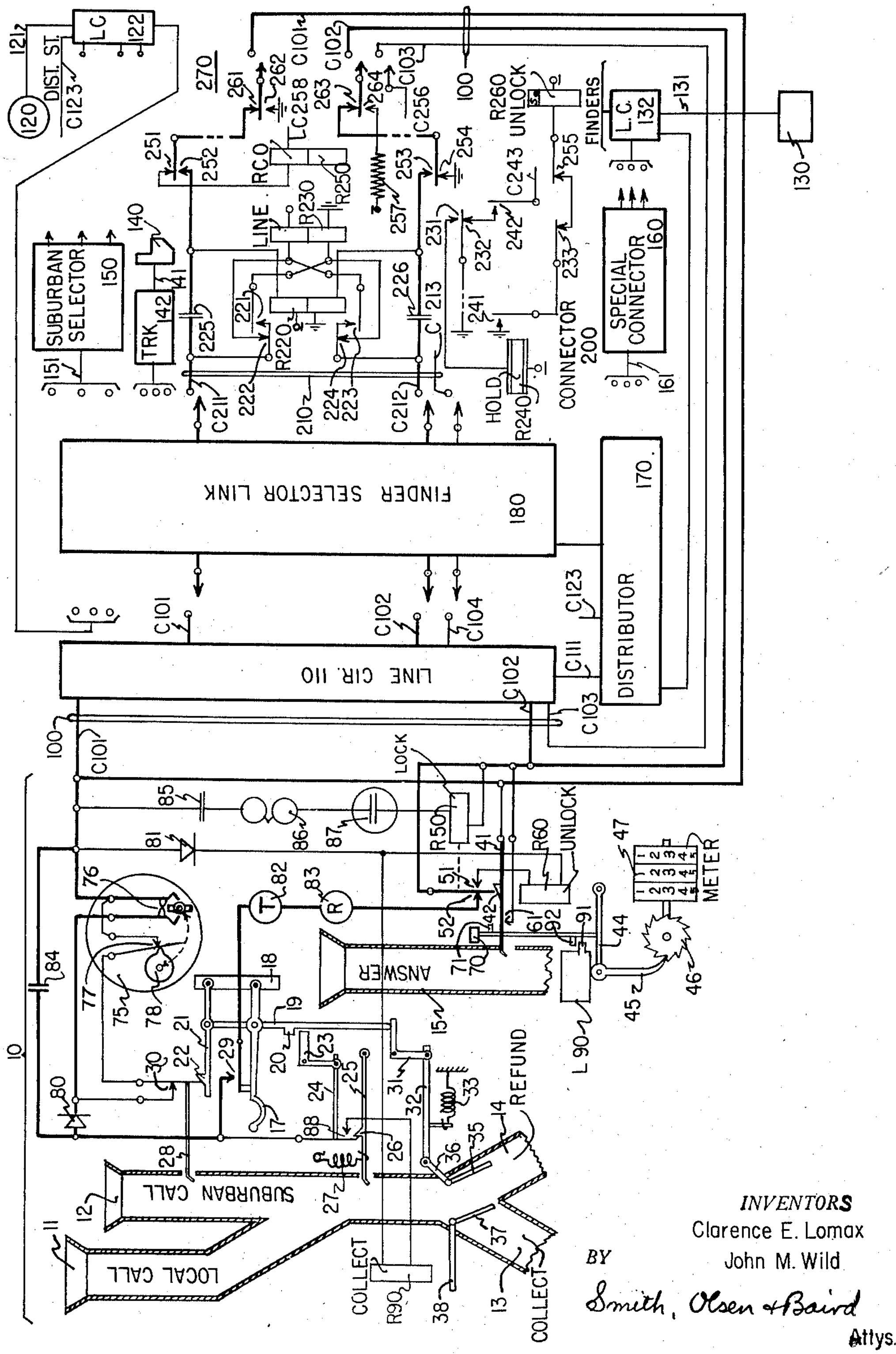
*INVENTORS*
Clarence E. Lomax
John M. Wild
BY Smith, Olsen & Baird
Attys.

Patented Jan. 29, 1952 2,583,783

UNITED STATES PATENT OFFICE 2,583,783

PAY STATION CIRCUITS FOR AUTOMATIC TELEPHONE SYSTEMS

Clarence E. Lomax, Chicago, Ill., and John M. Wild, Ithaca, N. Y., assignors to Automatic Electric Laboratories, Inc., Chicago, Ill., a corporation of Delaware Application February 3, 1948, Serial No. 5,954

18 Claims. (Cl. 179—6.3)

The present invention relates to automatic telephone systems, and more particularly to paystation circuits for such systems.

Heretofore in automatic telephone systems, it has been the established practice to render to paystations free incoming calls and to make charges against paystations only for completed outgoing calls. This practice has led to certain abuses by some persons using the paystations that are highly objectionable from the standpoint of the operating telephone company. For example, it has been found that a person at a paystation will initiate and extend a call to an ordinary subscriber substation, hold the call until the ringer at the subscriber substation operates a fixed number of times, and then disconnect obtaining a refund of the coin deposited at the paystation. By prearrangement, the subscriber at the subscriber substation will not answer any call immediately, and when operation of the ringer thereat takes place the fixed number of times and is then arrested, he is signalled that the person is at the paystation. The subscriber at the subscriber substation then initiates and extends a call to the paystation; whereupon the person at the paystation answers the call completing a connection.

The fundamental complaint of the telephone operating company against this practice is not the loss of revenue at the paystation, although this may be substantial, but is the unnecessary and excessive use and consequent busying of the automatic switching apparatus incident to carrying out this practice.

Accordingly, it is a general object of the present invention to provide in a telephone system, a substation circuit that requires a call registering operation in order to answer an incoming call thereto.

Another object of the invention is to provide in a paystation circuit, outgoing call registering mechanism and incoming call registering mechanism.

A further object of the invention is to provide in a paystation circuit coin controlled call registering mechanism for selectively governing the completion of free calls and of first and second types of charged calls respectively requiring corresponding first and second charges.

A still further object of the invention is to provide a paystation incorporating an improved and exceedingly simple circuit arrangement of the elements thereat.

Further features of the invention pertain to the particular arrangement of the circuit elements of the system; whereby the above outlined and additional operating features thereof are attained.

The invention, both as to its organization and method of operation, together with further objects and advantages thereof, will best be understood by reference to the following specification taken in connection with the accompanying drawing, in which the single figure illustrates the details of an automatic telephone system having incorporated therein the features of the present invention.

Referring now more particularly to the drawing, there is illustrated an automatic telephone system comprising an exchange serving a plurality of paystations, including the paystation 10, a plurality of ordinary subscriber substations, including the ordinary subscriber substation 120, and a plurality of special substations, including the special substation 130. The special substations 130, etc., are arranged at fire stations, police stations, and at other such locations. The paystations 10, etc., are provided with telephone lines 100, etc., extending thereto having conventional line circuits 110, etc., individual thereto; the ordinary subscriber substations 120, etc., are provided with subscriber lines 121, etc., extending thereto having conventional line circuits 122, etc., individual thereto; and the special substations 130, etc., are provided with telephone lines 131, etc., extending thereto having conventional line circuits 132, etc., individual thereto. Also the exchange comprises a plurality of finder-selector links, including the link 180, as well as a conventional distributor 170, commonly associated with the links 180, etc., and with the line circuits 110, 122, 132, etc. Also the exchange comprises a group of suburban selectors, including the suburban selector 150; preferably, the suburban selectors 150, etc., are of the conventional Strowger type having access to trunk lines, not shown, extending between the exchange illustrated and other exchanges, not shown. Further the exchange comprises a group of ordinary connectors, including the ordinary connector 200, and a group of special connectors, including the special connector 160. Finally, the exchange comprises an operator position 140 having a group of trunks, including the trunk 141, extending thereto and terminated by conventional trunk circuits 142, etc., individual thereto.

Preferably, the finders of the links 180, etc., are of the conventional Strowger type having access to the telephone lines 100, etc., to the subscriber lines 121, etc., and to the telephone lines 131, etc. Also the selectors of the links 180, etc., are of the conventional eleven level Strowger type having access to the trunks 151, etc., extending to the suburban selectors 150, etc., in the eleventh levels thereof; having access to the trunks 141, etc., extending to the operator position 140 in the tenth levels thereof; having access to the trunks 161, etc., extending to the special connectors 160, etc., in the ninth levels thereof; and having access to the trunks 210, etc., extending to the ordinary connectors 200, etc., in the eighth levels thereof.

Preferably, the special connectors 160, etc., are of the conventional Strowger type except that they are not operative to reverse the polarity over the calling line extending thereto when the call is answered on the called line extending therefrom. Further the special connectors 160, etc., have access to the telephone lines 131, etc., extending to the special substations 130, etc.

Preferably, the ordinary connectors are identical to the connector 200 which is of the conventional Strowger type except that it incorporates an additional or unlock relay in the relay group. Specifically, in the connector 200, the relay group comprises a back-bridge relay R220, a line relay R230, a hold relay R240, a ring cut-off relay R250, other conventional relays not shown, as well as the additional or unlock relay R260; together with the Strowger mechanism 270 provided with three individual wipers indicated. The Strowger mechanism 270 has access to the subscriber lines 121, etc., extending to the ordinary subscriber substations 120, etc., and to the telephone lines 100, etc., extending to the paystations 10, etc.

Each of the ordinary subscriber substations 120, etc., and each of the special substations 130, etc., is provided with conventional substation apparatus including a transmitter, a receiver, a dial of the 11-point type, as well as a ringer. For example, each of the 11-point dials at the various substations may be of the character of that disclosed in U. S. Patent No. 2,013,171, granted on September 3, 1935, to Edward S. Peterson.

Preferably, each of the paystations is identical to the paystation 10 that comprises a transmitter 82, a dial 75 of the 11-point type, a switchhook 17 controlling a hook-switch 29, and a control network, including two asymmetrical current conducting devices in the form of copper oxide rectifiers 80 and 81, a glow tube 87, a lock relay R50, and unlock relay R60 and a collect relay R90. Also the paystation 10 comprises coin receiving, collecting and refund mechanism, including a local call chute 11 adapted to receive a five-cent piece or equivalent slug, either being referred to as a coin, a suburban call chute 12 adapted to receive a ten-cent piece or an equivalent slug, either being referred to as a coin, an answer chute 15 adapted to receive a five-cent piece or an equivalent slug, either being referred to as a coin, and extending to a collect box, not shown, and a collect chute 13 extending to a collect box, not shown, and a refund chute 14 extending to a refund receptical, not shown. Finally, the paystation 10 comprises a meter 47 associated with a push button 70 that is provided with a key controlled lock mechanism L90 and which cooperates with the answer chute 15 as explained more fully hereinafter.

A better understanding of the connection and arrangement of the apparatus disposed at the paystation 10 in conjunction with the operation of the switching apparatus will be facilitated from a consideration of the extension of various calls involving the paystation 10, the ordinary subscriber substation 120 and the special substation 130.

First assuming that a call is to be extended from the calling paystation 10 to the called special substation 130, the person at the paystation 10 initiates the call by removing the receiver 83 from the switchhook 17; whereby the switchhook 17 is pivoted in the clockwise direction upon the mounting block 18 causing the push rod 19 to rise and disengage the horizontal arm of the pivotally mounted bell-crank 31. When the bell-crank 31 is thus disengaged, the coil spring 33 slides the rod 32 towards the right; whereby the arm 36 is pivoted in a clockwise direction causing the gate 35 to close the refund chute 14. At this time the gate 35 closing the refund chute 14 cooperates with the gate 37 closing the collect chute 13 in order to provide a pocket for trapping a deposited coin. Also the switchhook 17 closes the hook-switch or contacts 29. At this time a loop circuit is completed between the calling paystation 10 and the line relay, not shown, in the line circuit 110 individual to the telephone line 100. More particularly, battery potential in the line circuit 110 is connected via one winding of the line relay therein to the negative line conductor C101 of the telephone line 100; and positive battery or ground potential in the line circuit 110 is connected via the other winding of the line relay therein to the positive line conductor C102 of the telephone line 100; the negative line conductor C101 being connected via the impulse contacts 76 of the dial 75, the asymmetrical current conducting device 80, the contacts 29, the transmitter 82, the receiver 83, and the contacts 52 to the positive line conductor C102. Accordingly, the line relay in the line circuit 110 operates in order to initiate operation of the distributor 170 over the start conductor C111; whereby the distributor 170 assigns an idle one of the finder-selector links, such for example, as the link 180, for use at this time. The finder of the link 180 operates to find the calling telephone line 100, the telephone line 100 being marked as calling in the line circuit 110 by the application of battery potential upon the control conductor C104 thereof. When the finder of the link 180 finds the calling telephone line 100, ground potential therein is applied to the control wiper thereof and consequently to the control conductor C104 of the telephone line 100; whereby the cut-off relay, not shown, in the line circuit 110 operates in order to apply ground potential to the control conductor C103 of the telephone line 100 marking the telephone line 100 as busy to the connectors 200, etc., having access thereto. Also upon operating the cut-off relay in the line circuit 110 cuts off the line relay therein completing a direct loop circuit between the calling paystation 10 and the line relay in the selector of the link 180; whereby dial tone in the selector of the link 180 is returned over the loop circuit indicating to the person at the calling paystation 10 that he may proceed to dial the digits comprising the directory number of the called special substation 130.

The person at the calling paystation 10 proceeds to dial the directory number of the called special substation 130, without depositing a coin in the local call chute 11, since calls from the calling paystation 10 to the called special substation 130 are free. The directory number of the called special substation 130 may be 900. The person at the calling paystation 10 dials a digit by operating the finger wheel of the dial 75 in accordance therewith; whereby the finger wheel, upon its return, operates in a corresponding manner the impulse contacts 76, causing a corresponding series of impulses, constituting the digit, to be transmitted over the loop circuit including the telephone line 100. More particularly, the impulses of the first digit 9 are transmitted from the impulse contacts 76 via the path including the asymmetrical current conducting device 80, the contacts 29, the transmitter 82, the receiver 83 and the contacts 52 across the line conductors C101 and C102 of the telephone line 100. In order to prevent the transmission of impulses over the line conductors C101 and C102 of the telephone line 100 from having a tendency to operate the lock relay R50 included in series with the ringer 86 and the condenser 85, also bridged across the line conductors C101 and C102 of the telephone line 100, the last-mentioned circuit also includes the glow tube 87. Specifically, the glow tube 87 will not be rendered conductive during the transmission of the digit thereby positively preventing a false operation of the lock relay R50 and the ringer 86 included in series circuit relation in the ringer circuit bridged across the line conductors C101 and C102 of the telephone line 100.

When the first digit 9 is dialed, the selector of the link 180 responds thereto to select the group of special connectors, including the special connector 160, and then to select an idle special connector in the group mentioned. For example, the selector of the link 180 may select the trunk 161 extending to the special connector 160. At this time the selector of the link 180 switches through extending the loop circuit to the line relay in the special connector 160. The special connector 160 then responds to the second and third digits 0 and 0 to select the telephone line 131 extending to the special substation 130; whereby the idle or busy condition of the telephone line 131 as marked by the associated line circuit 132 is tested by the special connector 160 in accordance with conventional practice. In the event the special substation 130 is busy at this time, the special connector 160 operates to return busy tone current over the loop circuit extending back to the calling paystation 10; whereby the person thereat disconnects by replacing the receiver 83 upon the associated switchhook 17 bringing about the release of the apparatus in a manner substantially identical to that described hereinafter.

On the other hand, in the event the special substation 130 is idle at this time, the special connector 160 operates to project ringing current over the telephone line 131 in order to operate the ringer at the called special substation 130 and to return ring-back tone current over the loop circuit to the calling paystation 10 indicating to the person thereat that the called special substation 130 is being signalled at this time. When the person at the called special substation 130 answers the call, the special connector 160 switches through to complete a connection between the calling paystation 10 and the called special substation 130; however, the special connector 160 does not reverse the polarity over the loop circuit extending back to the calling paystation 10, since such operation would block the established connection in an undesirable manner. Accordingly, the person at the calling paystation 10 converses with the person at the called special substation 130, the connection being free as previously noted.

At the conclusion of the established connection, when the person at the calling paystation 10 disconnects by returning the receiver 83 upon the associated switchhook 17, the switchhook 17 is pivoted in the counterclockwise direction about the mounting block 18 depressing the push rod 19 to re-engage the horizontal arm of the pivotally mounted bell-crank 31. When the bell-crank 31 is thus engaged, it is pivoted in the clockwise direction sliding the rod 32 against the bias of the coil spring 33 toward the left; whereby the arm 36 is pivoted in the counterclockwise direction causing the gate 35 to open the refund chute 14. Also the switchhook 17 opens the contacts 29 interrupting the loop circuit extending between the paystation 10 and the special connector 160; whereupon the special connector 160 is released bringing about the release of the link 180. When the link 180 is thus released, the line circuit 110 again operates in order to return battery potential upon the control conductor C103 of the telephone line 100 marking the telephone line 100 as idle to the connectors 200, etc., having access thereto. Also at this time the line circuit 132 is operated to mark the telephone line 131 as idle to the special connectors 160, etc., having access thereto, assuming that the person at the special substation 130 has disconnected. At this time the established connection between the calling paystation 10 and the called special substation 130 is released and all of the apparatus involved therein is completely released and available for further use.

Now assuming that a call is to be extended from the calling paystation 10 to the called ordinary subscriber substation 120, the person at the paystation 10 initiates the call by removing the receiver 83 from the switchhook 17; whereby the line circuit 110 is again controlled to govern operation of the distributor 170; whereby the link 180 may be again assigned for use. The finder of the link 180 again operates to find the telephone line 100 extending to the calling paystation 10; whereby dial tone current in the selector of the link 180 is returned over the loop circuit to the calling paystation 10; all in the manner previously explained. In order to complete a connection from the calling paystation 10 to the called ordinary subscriber substation 120, it is necessary for the person at the calling paystation 10 to deposit a coin in the local call chute 11, as well as to dial the directory number of the called ordinary subscriber substation 120, which directory number may be 800. However, the person at the calling paystation 10 may attempt the extension of the connection in an unauthorized manner to the called ordinary subscriber substation 120, without depositing the coin in the local call chute 11, merely by dialing the directory number 800 of the called ordinary subscriber substation 120; whereupon the apparatus is released as explained more fully below.

First assume that the person at the calling paystation 10 attempts the extension of the connection therefrom to the called ordinary subscriber substation 120 in an unauthorized manner by failing to deposit a coin in the local call chute 11 and merely by dialing the directory number 800. When the first digit 8 is dialed the selector of the link 180 responds thereto to select the group of connectors, including the connector 200, and then an idle connector in the group mentioned. For example, the selector of the link 180 may select the trunk 210 extending to the connector 200, the trunk 210 being marked as idle to the selector of the link 180 by the application of battery potential upon the control conductor C213 thereof via a path, no shown. When the selector of the link 180 operates to select the connector 200 via the trunk 210, it switches through completing a direct loop circuit from the calling substation 10 to the line relay R230 in the connector 200; which loop circuit includes the contacts 222 and 224, as well as the line conductors C211 and C212 of the trunk 210. When this loop circuit is completed, the line relay R230 operates to complete, at the contacts 231, a circuit for operating the hold relay R240; and to complete a circuit, not shown, for operating the transfer relay, not shown, in the connector 200. The line relay R230 in the connector 200 then follows the second digit 0. Each time the line relay R230 restores and then reoperates, it interrupts and then recompletes, at the contacts 231, the circuit for retaining operated the hold relay R240, the latter relay being of the slow-to-release type, remaining operated during impulsing.

Also each time the line relay R230 restores and then reoperates, it completes and then interrupts, at the contacts 232, a path, including the contacts 242, for applying ground potential to the dial conductor C243 over which the vertical magnet, not shown, of the Strowger mechanism 270 is controlled. Also the line relay R230 completes and then interrupts, at the contacts 233, a circuit, including the contacts 241 and 255, for energizing the winding of the unlock relay R260; however, the latter relay, being of the slow-to-operate type, does not operate at this time. At the conclusion of the second digit 0, the line relay R230 is retained in its operated position bringing about restoration of the transfer relay, not shown; whereby the circuit is prepared via the dialing conductor C243 for the rotary magnet, not shown, of the Strowger mechanism 270.

When the third digit 0 is then dialed, the line relay R230 again follows repeating, at the contacts 232, over the dial conductor C243 and the circuit, not shown, to the rotary magnet, not shown, of the Strowger mechanism 270. At the conclusion of the third digit 0, the test relay, not shown, tests the idle or busy condition of the subscriber line 121 extending to the called ordinary subscriber substation 120 that has been selected at this time, which subscriber line 121 is marked either as idle or busy by the associated line circuit 122. In the event the subscriber line 121 is busy at this time, the test relay, not shown, operates in order to bring about the return of busy tone current over a path, not shown, to the loop circuit extending back to the calling paystation 10 in order to indicate to the person thereat that the desired connection may not be had due to the busy condition mentioned. The person at the calling paystation 10 then disconnects effecting the release of the apparatus in a manner substantially identical to that previously explained.

Now assuming that the subscriber line 121 extending to the called ordinary subscriber substation 120 is idle at this time, the test relay, not shown, does not operate and a switch relay, not shown, operates to complete a circuit including the ringing conductor C258, the upper winding of the ring cut-off relay R250, the contacts 251, 254 and 261, 263 for projecting ringing current over the line conductors of the subscriber line 121 in order to operate the ringer at the called ordinary subscriber substation 120; and to return ring-back tone current over a path, not shown, and over the loop circuit extending back to the calling paystation 10 in order to indicate to the person thereat that the called ordinary subscriber substation 120 is being signalled at this time.

When the subscriber at the called ordinary subscriber substation 120 answers the call, a low resistance circuit substantially identical to that previously traced is completed for energizing the upper winding of the ring cut-off relay R250; whereby the latter relay operates to complete a holding circuit, not shown, for energizing the lower winding thereof; to interrupt, at the contacts 251 and 254, the circuit for projecting ringing current over the subscriber line 121; to interrupt the path, not shown, for returning ring-back tone current over the loop circuit extending back to the calling paystation 10; and to complete, at the contacts 252 and 253, a loop circuit, including the contacts 261 and 263, between the called ordinary subscriber substation 120 and the upper and lower windings of the back-bridge relay R220. The back-bridge relay R220 then operates to reverse, at the contacts 221, 222, 223 and 224, the polarity of the trunk 210 with respect to the upper and lower windings of the line relay R230; whereby the polarity of the loop circuit extending back to the calling paystation 10 is reversed, ground potential being applied to the line conductor C101 and battery potential being applied to the line conductor C102. When the polarity of the loop circuit including the line conductors C101 and C102 is thus reversed, the asymmetrical current conducting device 80 blocks the passage of current therethrough via the previously traced path, including the impulsing contacts 76 of the dial 75, the contacts 29, the transmitter 82, the receiver 83, and the contacts 52. Accordingly, the loop circuit extending from the calling paystation 10 to the line relay R230 in the connector 200 is effectively interrupted by the asymmetrical current conducting device 80 bringing about the restoration of the line relay R230. Upon restoring the line relay R230 interrupts, at the contacts 231, the circuit for energizing the winding of the hold relay R240 in order to cause the latter relay to restore shortly thereafter, it being of the show-to-release type. Upon restoring the hold relay R240 brings about the release of the Strowger mechanism 270 and the remainder of the operated relays in the connector 200; whereby battery potential is returned upon the control conductor C213 of the trunk 210 again marking the trunk 210 and consequently the connector 200 as idle to the selectors of the links 180, etc., having access thereto. Also the link 180 is released; whereby the line circuit 110 is reoperated in order to lock out of service the telephone line 100 and the calling paystation 10. At this time the person at the calling paystation 10 can place the telephone line 100 back in service again only by disconnecting in the manner previously explained. Of course, the subscriber at the called ordinary subscriber substation 120 upon answering the call thereto found that the call had been abandoned and then disconnects. Accordingly, in the event a person at the calling paystation 10 attempts to extend a call to the called ordinary subscriber substation 120 in an unauthorized manner by failing to deposit a coin in the local call chute 11 and merely by dialing the directory number 800 of the called ordinary subscriber substation 120, the switching apparatus is operated to extend the call and is then automatically released when the subscriber at the called ordinary subscriber substation 120 answers the call; and then the paystation 10 is locked out of service by the associated line circuit 110 until the person thereat disconnects by replacing the receiver 83 upon the associated switchhook 17; all in the manner described above.

Now assuming that the person at the calling paystation 10 after initiating the call by moving the receiver 83 from the associated switchhook 17 first deposits a coin in the local call chute 11 before dialing the directory number 800 of the called ordinary subscriber substation 120. When the coin is deposited in the local call chute 11, it falls past the end of the lever 25 engaging and pivoting it against the bias of the coil spring 27 in the counterclockwise direction; whereby the latch 26 carried on the lever 25 disengages the associated spring permitting closure of the contacts 88; whereby a multiple path including the asymmetrical current conducting device 81, the winding of the collect relay R90, the contacts 88 and 29, the transmitter 82, the receiver 83 and the contacts 52, is completed between the line conductors C101 and C102 of the telephone line 100. Although this multiple path is completed, no current passes therethrough since the asymmetrical current conducting device 81 effectively blocks the path since the line conductors C101 and C102 of the telephone line 100 are respectively poled negative and positive at this time. Thus the collect relay R90 is not operated and current in the loop circuit between the line conductors C101 and C102 of the telephone line 100 passes via the first mentioned path, including the asymmetrical current conducting device 80. The coin then falls past the end of the lever 25 into the pocket defined between the gates 35 and 37; whereby the coin at this time may be either collected or refunded as explained more fully hereinafter.

When the person at the calling paystation 10 then dials the directory number 800 of the called ordinary subscriber substation 120, the selector of the link 180 responds to the first digit 8 and the connector 200 may be again selected thereby, and then responds to the second and third digits 0 and 0 to select the subscriber line 120 extending to the called ordinary subscriber substation 120.

First assuming that the called ordinary subscriber substation 120 is busy at this time, when it is tested as such by the connector 200, busy tone current is returned over the loop circuit back to the calling paystation 10 indicating the circumstance noted to the person thereat. When the person at the calling paystation 10 then disconnects by replacing the receiver 83 upon the associated switchhook 17, the switchhook 17 is pivoted in the counterclockwise direction about the mounting block 18 in order to depress the push rod 19 and to open the contacts 29. As the push rod 19 is depressed, the lug 20 carried thereby engages the horizontal arm of the bell-crank 23 rotating the bell-crank 23 in the clockwise direction; whereby the rod 24 is moved toward the left forcing the end of the associated switch spring over the end of the latch 26 carried on the lever 25 thereby to open the contacts 88. Also as the lever 19 is depressed, the lower end thereof re-engages the horizontal arm of the bell-crank 31 rotating it in the clockwise direction in order to slide the rod 32 toward the left against the bias of the coil spring 33; whereby the arm 36 is rotated in the counterclockwise direction opening the gate 35 in the refund chute 14 in order to cause the deposited coin to fall into the refund receptacle, not shown. At this time the first path including the contacts 29 and the asymmetrical current conducting device 80 and the second path including the contacts 88 and 29 and the asymmetrical current conducting device 81 are both opened; whereby the connector 200 and the link 180 are released; all in the manner previously described.

Now assuming that when the connector 200 operates to select the subscriber line 121 extending to the called ordinary subscriber substation 120 that the subscriber line 121 is tested as idle, the connector 200 operates to project ringing current over the subscriber line 121 and to return ringback tone current over the loop circuit extending back to the calling paystation 10 in the manner previously explained. Subsequently, when the subscriber at the called ordinary subscriber substation 120 answers the call, the ring cut-off relay R250 and then the back-bridge relay R220 in the connector 200 are operated; whereby the back-bridge relay R220 reverses, at the contacts 221, 222, 223, and 224, the polarity of the trunk 10 and consequently the polarity of the telephone line 100 included in the loop circuit extending back to the calling paystation 10. At this time the line conductors C101 and C102 of the telephone line 100 are respectively poled positive and negative; whereby the asymmetrical current conducting device 81 passes current via the second path between the line conductors C101 and C102; and in an obvious manner the asymmetric current conducting device 80 blocks the passage of current through the first path between the line conductors C101 and C102. Accordingly, at this time, the line relay R230 in the connector 200 is retained in its operated position retaining operated the connector 200 and the link 180; whereby the loop circuit extending from the calling paystation 10 to the upper and lower winding of the line relay R230 is operatively connected to the loop circuit extending from the called ordinary subscriber substation 120 to the upper and lower windings of the back-bridge relay R220 via the condensers 225 and 226. Accordingly, at this time, an established connection is completed between the calling paystation 10 and the called ordinary subscriber substation 120 and conversation therebetween may take place. It is again noted that the second path between the line conductors C101 and C102 of the telephone line 100 that is completed at the calling paystation 10 includes the asymmetrical current conducting device 81, the winding of the collect relay R90, the contacts 88 and 29, the transmitter 82, the receiver 83 and the contacts 52; whereby the collect relay R90 operates attracting the arm 38 rotating the gate 37 to its open position in the collect chute 13. Accordingly, the coin in the pocket defined by the gate 35 and 37 falls through the collect chute 13 into the collect box, not shown.

Subsequently, when the person at the calling paystation 10 disconnects by returning the receiver 83 upon the associated switchhook 17, the push rod 19 is depressed in order to bring about opening of the contacts 88 and opening of the gate 35 in the refund chute 14. Also the contacts 29 are opened by the switchhook 17; whereby the connector 200 and the link 180 are released in the manner previously explained. Also when the contacts 88 are opened, the circuit for energizing the winding of the collect relay R90 is interrupted; whereby the arm 39 is released causing the gate 37 again to close the collect chute 13. At this time the connection between the calling paystation 10 and the called ordinary subscriber substation 120 is released and all of the apparatus involved therein is completely released and available for further use.

Now assuming that a call is to be extended from the calling paystation 10 to the operator position 140, the person at the paystation 10 initiates the call by removing the receiver 83 from the associated switchhook 17 and by dialing the single digit 0 comprising the directory number of the called operator position 140, without depositing a coin in the local call chute 11, since this connection constitutes a free call. When the call is thus initiated at the calling paystation 10, the line circuit 110 is operated to govern the distributor 170; whereby the link 180 may be assigned for use at this time. The finder of the link 180 finds the telephone line 100 extending to the calling paystation 10 and dial tone current in the selector of the link 180 is returned over the loop circuit back to the calling paystation 10.

When the person at the calling paystation 10 dials the single digit 0, the selector of the link 180 responds thereto in order to select the group of trunks, including the trunk 141, and then an idle trunk in the group mentioned. For example, the selector of the link 180 may select the trunk 141 terminated by the trunk circuit 142 and extending to the operator position 140, the trunk 141 being marked as idle by the associated trunk circuit 142. When the selector of the link 180 selects the trunk 141, it switches through completing a direct loop circuit between the calling paystation 10 and the line relay, not shown, in the trunk circuit 142; whereby the line relay mentioned operates to effect signalling over the trunk 141 indicating to the operator at the position 140 that a call is waiting to be answered on the trunk 141. When the operator at the position 140 answers the call, the trunk circuit 142 operates to complete a connection between the calling paystation 10 and the called operator position 140. Of course, when the trunk circuit 142 switches through, the polarity of the loop circuit extending back to the calling paystation 10 is not reversed as it is not desired to block the transmitter 82 and the receiver 83 thereat and to effect the release of the connection since the present connection represents a free call as previously explained. At the conclusion of the established connection when the person at the calling paystation 10 disconnects by replacing the receiver 83 upon the associated switchhook 17, the loop circuit extending therefrom to the trunk circuit 142 is interrupted; and when the operator at the position 140 disconnects, the trunk circuit 142 is released bringing about the release of the link 180; whereupon the trunk circuit 142 operates to mark the trunk 141 as idle to the selectors of the links 180, etc., having access thereto. Also the line circuit 110 operates to mark the telephone line 100 as idle to the connectors 200, etc., having access thereto. At this time the established connection between the calling paystation 10 and the called operator position 140 is released and all of the apparatus involved therein is completely released and available for further use.

Now assuming that a call is to be extended from the calling paystation 10 to a called suburban subscriber substation in another exchange, not shown, the person at the paystation 10 initiates the call by removing the receiver 83 from the switchhook 17; whereby the line circuit 110 is again controlled to govern operation of the distributor 170; whereby the link 180 may be again assigned for use. The finder of the link 180 again operates to find the telephone line 100 extending to the calling paystation 10; whereby dial tone current in the selector of the link 180 is returned over the loop circuit to the calling paystation 10; all in the manner previously explained. In order to complete a connection from the calling paystation 10 to the called suburban subscriber substation mentioned, it is necessary for the person at the calling paystation 10 to deposit a coin in the suburban call chute 12, as well as to dial the directory number of the called suburban subscriber substation mentioned, which directory number is preceded by the prefix digit 11 and may be 11—1234. However, the person at the calling paystation 10 may attempt the extension of the connection in an unauthorized manner to the called suburban subscriber substation mentioned without depositing the coin in the suburban call chute 12 merely by dialing the directory number 11—1234 of the called suburban subscriber substation mentioned; whereupon the call is intercepted at the operator position 140 in the exchange illustrated as explained more fully below.

First assuming that the person at the calling paystation 10 attempts the extension of the connection therefrom to the called suburban subscriber substation mentioned in an unauthorized manner by failing to deposit a coin in the suburban call chute 12, and merely by dialing the directory number 11-1234. When the finger wheel of the dial 75 at the calling paystation 10 is operated in accordance with the digit 11, the impulse contacts 76 are controlled to transmit in a single series, eleven impulses; however, the cam 78 is arranged to close the shunt springs 77 during the transmission of the eleventh impulse of the series mentioned; which circumstance causes the dial 75 to transmit only a series of ten impulses over the telephone line 100 unless the contacts 30 are also opened; which operation is brought about only incident to the depositing of a coin in the suburban call chute 12 as explained more fully below. Accordingly, in the present example, the contacts 30 are closed; whereby the cam 78 closes the shunt springs 77 during the transmission of the eleventh impulse by the impulse contacts 76; whereby a shunt path is completed via the contacts 30 and the shunt springs 77 around the impulse contacts 76 of the dial 75. Hence, the dial 75 transmits the digit 0 even though the finger wheel thereof was operated in accordance with the digit 11 due to the circumstance above noted; whereby the selector of the link 180 receives the digit 0 and operates in the manner previously explained first to select the group of trunks, including the trunk 141, and then an idle trunk in the group mentioned. Accordingly, the connection may be routed from the calling paystation 10 by the selector of the link 180 over the trunk 141 to the operator position 140, the trunk 141 being marked as idle to the selector of the link 180 by the trunk circuit 142. The remaining digits 1234 dialed at the calling paystation 10 are without effect as they are merely transmitted to the line relay in the trunk circuit 142. When the operator at the position 140 answers the call, the trunk circuit 142 operates to complete a connection between the calling paystation 10 and the called operator position 140; however, the polarity of the loop circuit extending back to the calling paystation 10 is not reversed as it is not desired to block the transmitter 82 and the receiver 83 thereat and to effect the release of the connection since the present connection represents a free intercepted call. The operator at the position 140 advises the person at the calling paystation 10 that the call has been intercepted by virtue of the fact that he attempted the extension of a connection to a called suburban subscriber substation in an unauthorized manner without depositing a coin in the suburban call chute 12. At the conclusion of the established connection, when the person at the calling paystation 10 disconnects and the operator at the position 140 disconnects, the apparatus is released in the manner previously described.

Now assuming that the person at the calling paystation 10 after initiating the call by removing the receiver 83 from the associated switchhook 17 first deposits a coin in the suburban call chute 12 before dialing the directory number 11–1234 of the called suburban subscriber substation mentioned. When the coin is deposited in the local call chute 12, it falls past the end of the push rod 28 urging it toward the right; whereby the contacts 30 are opened and the end of the associated switch spring is caught behind the latch 22 carried by the lever 21 pivotally mounted both to the push rod 19 and to the mounting block 18. Accordingly, the latch 22 latches the contacts 30 open. The coin deposited in the suburban call chute 12 then falls past the end of the lever 25 engaging and pivoting it against the bias of the coil springs 27 in the counterclockwise direction; whereby the latch 26 carried on the lever 25 disengages the associated spring permitting closure of the contacts 88; whereby the multiple second path including the asymmetrical current conducting device 81, the winding of the collect relay R90, the contacts 88 and 29, the transmitter 82, the receiver 83 and the contacts 52 is completed between the line conductors C101 and C102 of the telephone line 100.

At this time when the person at the calling paystation 10 dials the digit 11 the impulse contacts 76 transmit a series of eleven impulses and the cam 78 closes the shunt springs 77 during the transmission of the eleventh impulse of the series; however, without effect, since the contacts 30 occupy their open position. Accordingly, in the present example a continuous series of eleven impulses is transmitted over the telephone line 100 in accordance with the digit 11 dialed by the person at the calling paystation 10. The selector of the link 180 responds to the digit 11 to select the group of suburban selectors, including the suburban selector 150, and then an idle suburban selector in the group mentioned. For example, the selector of the link 180 may select the trunk 151 extending to the suburban selector 150; whereupon the selector of the link 180 switches through. The suburban selector 150 then responds to the second digit 1 dialed at the calling paystation 10 to select the corresponding group of trunk lines and then an idle trunk line therein extending to the corresponding suburban exchange and then switches through. The automatic switching apparatus, not shown, in the suburban exchange mentioned responds to the remaining digits 2, 3 and 4 to select the subscriber line extending to the called suburban subscriber substation mentioned. The subsequent operation of the switching apparatus mentioned is in accordance with conventional practice, and assuming that the called suburban subscriber substation mentioned is idle at this time, the connector in the automatic switching apparatus mentioned operates to project ringing current thereover and to return ring-back tone current over the loop circuit extending back to the calling paystation 10.

Subsequently, when the subscriber at the called suburban subscriber substation mentioned answers the call, the connector in the automatic switching apparatus mentioned operates to interrupt the projection of ringing current over the subscriber line extending to the called suburban subscriber substation, to interrupt the return of ring-back tone current over the connection extending back to the calling paystation 10, and to reverse the polarity of the loop circuit extending back to the calling paystation 10. When the polarity of the loop circuit extending back to the calling paystation 10 is reversed, the asymmetrical current conducting device 80 blocks the passage of current through the first multiple path, while the asymmetrical current conducting device 81 passes current through the second multiple path operating the collect relay R90. The collect relay R90 attracts the arm 38 rotating the gate 37 to its open position in the collect chute 13. Accordingly, the coin in the pocket defined by the gates 35 and 37 falls through the collect chute 13 into the collect box, not shown. At this time an established connection is completed between the calling paystation 10 and the called suburban subscriber substation mentioned.

Subsequently, when the person at the calling paystation 10 disconnects by returning the receiver 83 upon the associated switchhook 17, the push rod 19 is depressed in order to bring about opening of the contacts 88 and opening of the gate 35 in the refund chute 14. Also the contacts 29 are opened by the switchhook 17; whereby the automatic switching apparatus, not shown, in the suburban exchange mentioned, the suburban selector 150 and the link 180 are released in a manner identical to that previously explained. Also when the contacts 88 are opened, the circuit for energizing the winding of the collect relay R90 is interrupted; whereby the arm 38 is released causing the gate 37 again to close the collect chute 13. Further when the push rod 19 is depressed, the lever 21 is rotated in the counterclockwise direction about the mounting block 18 causing the latch 22 to disengage the associated spring; whereby the contacts 30 are again closed in order to render effective the shunt springs 77 controlled by the cam 78 in the dial 75. At this time the connection between the calling paystation 10 and the called suburban subscriber substation mentioned is released and all of the apparatus involved therein is completely released and available for further use.

Now assuming that a call is to be extended from the calling ordinary subscriber substation 120 to the called paystation 10, the subscriber at the calling ordinary subscriber substation 120 first initiates the call and then dials the directory number of the called paystation 10, which directory number may be 811. When the call is initiated at the calling ordinary subscriber substation 120, the line circuit 122 is controlled over the associated subscriber line 121 and operates to apply ground potential to the distributor start conductor C123; whereby the distributor 170 is governed to assign an idle one of the links, such for example, as the link 180. The finder of the link 180 operates to find the subscriber line 121 extending to the calling ordinary subscriber substation 120; whereby the line circuit 122 is operated to mark the subscriber line 121 as busy to the connectors 200, etc., having access thereto. When the first digit 8 is dialed at the calling ordinary subscriber substation 120, the selector of the link 180 responds thereto to select the group of connectors, including the connector 200, and then an idle connector in the group mentioned. For example, the finder of the link 180 may select the trunk 210 extending to the connector 200; whereby the selector of the link 180 switches through completing a loop circuit between the calling ordinary subscriber substation 120 and the line relay R230 in the connector 200. When the second and third digits 1 and 1 are dialed at the calling ordinary subscriber substation 120, the line relay R230 in the connector 200 follows bringing about operation of the Strowger mechanism 270 to select the telephone line 100 extending to the called paystation 10. The idle or busy condition of the called paystation 10 is then tested by the test relay, not shown, in the connector 200, ground potential being applied to the control conductor C103 of the telephone line in the event the called paystation 10 is busy at this time and battery potential in the line circuit 110 being applied to the control conductor C103 of the telephone line 100 in the event the called paystation 10 is idle at this time. The connector 200 operates in response to the markings mentioned in the manner previously explained; and assuming that the paystation 10 is idle at this time, the test relay, not shown, in the connector 200 does not operate and the switch relay, not shown, in the connector 200 operates to connect ringing current over a path, not shown, including the ringing conductor C258, the upper winding of the ring cut-off relay R250, the contacts 251 and 261 to the line conductor C101 of the telephone line 100; the line conductor C102 of the telephone line 100 being connected via the contacts 263 and 254 to ground potential. Also ring-back tone current is returned via a connection, not shown, over the loop circuit extending back to the calling ordinary subscriber substation 120 in order to indicate to the subscriber thereat that the called paystation 10 is being signalled at this time. The ringing current projected over the line conductors C101 and C102 of the telephone line 100 traverses a path, including the winding of the alternating current lock relay R50, the glow tube 87, the ringer 86 and the condenser 85; whereby the glow tube 87 is rendered conductive, the lock relay R50 is operated, and the ringer 86 is operated in order to signal the called paystation 10. Upon operating the lock relay R50 interrupts, at the contacts 52, a point in the previously traced circuit for connecting the transmitter 82 and the receiver 83 across the line conductors C101 and C102 of the telephone line 100; and completes, at the contacts 51, a path, including the asymmetrical current conducting device 81 for bridging the winding of the unlock relay R60 across the line conductors C101 and C102 of the telephone line 100. When the lock relay R50 is thus operated, the associated switch spring is caught behind the insulating latch 42 carried by the switch spring 41 in order to retain the contacts 52 in their open circuit position and to retain the contacts 51 in their closed circuit position. At this time the line conductors C101 and C102 of the telephone line 100 are respectively poled negative and positive; whereby the asymmetrical current conducting device 81 blocks the passage of current through the winding of the unlock relay R60, thereby preventing energization of the upper winding of the ring cut-off relay R250 in the connector 200 and the consequent operation thereof at this time. Accordingly, the projection of ringing current from the connector 200 over the telephone line 100 to the called paystation 10 continues until either the call is abandoned at the calling ordinary subscriber substation 120 or is answered at the called paystation 10.

First assuming that there is no one available to answer the call at the called paystation 10, after a suitable interval of time, the subscriber at the calling ordinary subscriber substation 120 will disconnect interrupting the loop circuit extending therefrom to the upper and lower windings of the line relay R230 in the connector 200. Upon restoring the line relay R230 completes, at the contacts 233 a circuit, including the contacts 241 and 255, for energizing the winding of the unlock relay R260; whereby the latter relay operates shortly thereafter, it being of the slow-to-operate type. Upon operating the unlock relay R260 interrupts, at the contacts 261 and 263, the path for projecting ringing current over the telephone line 100; and completes, at the contacts 262 and 264 paths for connecting ground potential and battery potential via the resistor 257 respectively to the line conductors C101 and C102 of the telephone line 100. At this time the line conductors C101 and C102 of the telephone line 100 are poled respectively positive and negative; whereby the asymmetrical current conducting device 81 passes current through the winding of the unlock relay R60 at the called paystation 10 effecting operation thereof. Upon operating the unlock relay R60 moves the switch spring 41 downwardly closing the contacts 61, without effect at this time, whereby the insulating latch 42 disengages the associated switch spring causing the switch spring mentioned to be restored in order to open the contacts 51 and to close the contacts 52. When the contacts 51 are thus opened, the circuit for operating the unlock relay R60 is interrupted; and when the contacts 52 are closed, the circuit for connecting the transmitter 82 and the receiver 83 across the line conductors C101 and C102 of the telephone line 100 is prepared. The unlock relay R60 then restores; whereby the switch spring 41 is restored in the upper direction and the contacts 61 are opened. At this time the apparatus at the called paystation 10 is completely released.

Shortly following the restoration of the line relay R230 in the connector 200, the hold relay R240, being of the slow-to-release type, restores to interrupt at the contacts 241, the circuit for retaining operated the unlock relay R260 and to bring about the release of the Strowger mechanism 270 and the remainder of the operated relays in the connector 200; whereby the link 180 is released. At this time the line circuit 122 operates in order to return battery potential upon the control conductor of the subscriber line 121; whereby the subscriber line 121 is marked as idle to the connectors 200, etc., having access thereto. At this time all of the operated apparatus has been completely released.

Now assume that when the call is extended in the manner described above from the calling ordinary subscriber substation 120 to the called paystation 10, a person at the called paystation 10 answers the call. In order to answer the call the person at the called paystation 10 must not only remove the receiver 83 from the associated switchhook 17, but he must deposit a coin in the answer chute 15. More particularly, when the receiver 83 is removed from the associated switchhook 17, the contacts 29 are closed; however, the circuit for connecting the transmitter 82 and the receiver 83 across the line conductors C101 and C102 of the telephone line 100 remains open at the contacts 52, since the insulation latch 42 retains the contacts 52 in their open position and the contacts 51 in their closed position as previously explained. Thus no communication connection is completed at the called paystation 10 merely by removing the receiver 83 from the associated switchhook 17. However, when the person at the called paystation 10 deposits a coin in the answer chute 15, the coin falls past the end of the switch spring 41 depressing the switch spring 41 closing the contacts 61 to complete a direct short across the line conductors C101 and C102 of the telephone line 100 and to cause the insulation latch 42 to disengage the associated spring; whereby the contacts 51 are opened and the contacts 52 are closed. The coin mentioned then falls into the collect box, not shown. When the direct short mentioned is completed between the line conductors C101 and C102 of the telephone line 100, a circuit substantially identical to that previously traced is completed for energizing the upper winding of the ring cut-off relay R250 in the connector 200. The ring cut-off relay R250 then operates to complete a holding circuit, not shown, for energizing the lower winding thereof; to interrupt, at the contacts 251 and 254 the path for projecting ringing current over the telephone line 100; and to complete at the contacts 252 and 253, a loop circuit between the upper and lower windings of the back-bridge relay R220 and the called paystation 10. The loop circuit mentioned includes the contacts 252, 253, 261 and 263, the line conductors C101 and C102 of the telephone line 100, the impulse contacts 76 of the dial 75, the asymmetrical current conducting device 80, the contacts 29, the transmitter 82, the receiver 83, and the contacts 52. Since the line conductors C101 and C102 are poled respectively negative and positive currents traverse the loop circuit traced above via the asymmetrical current conducting device 80 energizing the transmitter 82 and the receiver 83 as well as the upper and lower windings of the back-bridge relay R220. Accordingly, the back-bridge relay R220 operates in order to reverse at the contacts 221, 222, 223 and 224, the polarity of the loop circuit extending between the calling ordinary subscriber substation 120 and the upper and lower windings of the line relay R230; which reversal of polarity over the loop circuit mentioned may be employed in the line circuit 122 individually associated with the subscriber line 121 for metering or other control purposes in a conventional manner. Finally, the loop circuit extending between the calling ordinary subscriber substation 120 and the line relay R230 and the loop circuit extending between the called paystation 10 and the back-bridge relay R220 are interconnected by the condensers 225 and 226 completing an established connection between the calling ordinary subscriber substation 120 and the called paystation 10.

At the conclusion of the established connection when the subscriber at the calling ordinary subscriber substation 120 disconnects, the line relay R230 restores in order to bring about the restoration of the hold relay R240 shortly thereafter the latter relay being of the slow-to-release type. In this case the unlock relay R260 is not operated incident to the restoration of the line relay R230 since the ring cut-off relay R250 occupies its operated position interrupting, at the contacts 255, a point in the previously traced circuit for operating the unlock relay R260. Accordingly, the connector 200 is released bringing about the release of the link 180; whereby the line circuit 122 operates again to mark the subscriber line 121 as idle to the connectors 200, etc., having access thereto. Also when the connector 200 is thus released, ground potential is removed from the control conductor C103 of the subscriber line 100; whereby the line circuit 110 operates in order again to mark the telephone line 100 as idle to the connectors 200, etc., having access thereto, assuming that the person at the called paystation 10 has disconnected at this time. When the person at the called paystation 10 disconnects by replacing the receiver upon the switchhook 17 the contacts 29 are opened disconnecting the transmitter 82 and the receiver 83 from across the line conductors C101 and C102 of the telephone line 100. At this time the connection between the calling ordinary subscriber substation 120 and the called paystation 10 is released and all of the apparatus involved therein is completely released and available for further use.

In view of the foregoing it will be understood that in order to answer a call in the called paystation 10, it is necessary to deposit a coin in the answer chute 15 in order to effect the release of the insulation latch 42 and closure of the contacts 61 in the manner previously explained. However, an alternative arrangement is provided for accomplishing these objectives that comprises the push button 70, the meter 47 and the lock mechanism L90. More particularly, an authorized person at the called paystation 10 may possess a key which will fit the lock mechanism L90; whereby the latch 91 may be retracted from below the associated lug 92 carried by the push button 70; whereby the push button 70 may be depressed manually. When the push button 70 is thus operated the finger 71 carried thereby engages and depresses the switch spring 41 in a manner identical to the action of a coin deposited in the answer chute 15; whereby the insulation latch 42 releases the associated switch spring and the contacts 61 are closed for the purpose previously explained. Also when the push rod 70 is thus operated the lower end thereof engages the pivotally mounted lever 44 depressing it causing the pall 45 to operate the associated ratchet 46; whereby the wheels of the meter 47 are actuated to register one call.

In view of the foregoing, it will be understood that a call may be answered at the called paystation 10 either by depositing a coin in the answer chute 15 or by depressing the push rod 70 after the lock mechanism L90 has been operated. In the first mentioned event, the coin deposited in the answer chute 15 falls into the collect box, not shown; and in the second mentioned event the meter 47 is operated to register the answering of a call at the called paystation 10. Thus the coin controlled mechanism, including the answer chute 15, constitutes a first manually controlled incoming call register; and the key-lock controlled mechanism, including the push button 70, the lock mechanism L90 and the meter 47, constitutes a second manually controlled incoming call register. It, of course, follows that in order to totalize the incoming calls to the paystation 10 registered during a given period that it is necessary both to count the coins in the collect box, not shown, associated with the answer chute 15, and to read the meter 47.

Likewise it will be understood that the coin controlled mechanism, including the local call chute 11, the suburban call chute 12 and the collect chute 13, constitutes a manually controlled outgoing call register; and that in order to totalize the outgoing calls from the paystation 10 registered during a given period it is necessary only to count the coins in the collect box, not shown, associated with the collect chute 13. More particularly, the number of small denomination coins in the collect box mentioned corresponds to the number of local outgoing calls that has been completed from the paystation 10; and the number of high denomination coins in the collect box mentioned corresponds to the number of suburban outgoing calls that has been completed from the paystation 10.

Finally, in connection with the arrangement of the equipment at the paystation 10, it is noted that at the end of a given period should the total number of outgoing calls registered bear a reasonable relationship with respect to the total number of incoming calls registered, the person on whose premises the paystation 10 is located may be entitled to an appropriate refund of at least a portion of the coins disposed in the collect box, not shown, associated with the answer chute 15. In other words, the equipment disposed at the paystation 10 merely requires the prepayment of coins incident to the completion of incoming calls thereto; and the ultimate charge for the telephone services rendered to the paystation 10 may be determined in view of the relationship between the number of outgoing calls completed therefrom and the number of incoming calls completed thereto.

In view of the foregoing it is apparent that there has been provided an automatic telephone system including a paystation circuit incorporating an improved coin controlled arrangement for governing both the extension of outgoing calls therefrom and the answering of incoming calls thereto.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an automatic telephone system including a calling station, a called station, a called operator position, and numerical switching apparatus accessible to said calling station and having access to said called station and to said called operator position, said switching apparatus being responsive to a first digit to route the call toward said called station and to a second digit to route the call toward said called operator position, wherein said first digit is larger than said second digit; digit mechanism located at said calling station and selectively operative to register said first digit or said second digit and to transmit the registered digit, normally effective blocking means located at said calling station for transmitting from said calling station to said switching apparatus said second digit in response to the transmission of said first digit by said digit mechanism in order that the call from said calling station is routed by said switching apparatus toward said called operator position instead of toward said called station as intended, and manually controlled call registering mechanism located at said calling station for rendering ineffective said blocking means so that said first digit is transmitted from said calling station to said switching apparatus in response to the transmission of said first digit by said digit mechanism in order that the call from said calling station is routed by said switching apparatus toward said called station as intended.

2. In an automatic telephone system including a calling station, a called station, a called operator position, and numerical switching apparatus accessible to said calling station and having access to said called station and to said called operator position, said switching apparatus being responsive to a first digit to route the call toward said called station and to a second digit to route the call toward said called operator position, wherein said first digit is larger than said second digit; digit mechanism located at said calling station and selectively operative to register said first digit or said second digit and to transmit the registered digit, normally effective blocking means located at said calling station for transmitting from said calling station to said switching apparatus said second digit in response to the transmission of said first digit by said digit mechanism in order that the call from said calling station is routed by said switching apparatus toward said called operator position instead of toward said called station as intended, and coin-controlled call registering mechanism located at said calling station for rendering ineffective said blocking means so that said first digit is transmitted from said calling station to said switching apparatus in response to the transmission of said first digit by said digit mechanism in order that the call from said calling station is routed by said switching apparatus toward said called station as intended.

3. In an automatic telephone system including a calling station, a called station, a called operator position, and numerical switching apparatus accessible to said calling station and having access to said called station and to said called operator position, said switching apparatus being responsive to a first digit to route the call toward said called station and to a second digit to route the call toward said called operator position, wherein said first digit is larger than said second digit; digit mechanism located at said calling station and including means selectively operative to register said first digit or said second digit and impulse contacts operative to transmit the registered digit and auxiliary contacts closed in response to operation of said impulse contacts to transmit said second digit, means including normally closed blocking contacts located at said calling station and connecting said auxiliary contacts in shunt to said impulse contacts for causing the transmission from said calling station to said switching apparatus of said second digit in response to the transmission of said first digit by said impulse contacts in order that the call from said calling station is routed by said switching apparatus toward said called operator position instead of toward said called station as intended, and manually controlled call registering mechanism located at said calling station for opening said blocking contacts so that said first digit is transmitted from said calling station to said switching apparatus in response to the transmission of said first digit by said impulse contacts in order that the call from said calling station is routed by said switching apparatus toward said called station as intended.

4. In a telephone system including a line, a station associated with said line, and means for extending outgoing calls from said station over said line and for routing incoming calls to said station over said line; said station comprising first and second coin-operated mechanisms, normally effective first blocking means for preventing the completion of a two-way communication connection incident to initiation of an outgoing call from said station, means controlled by operation of said first mechanism for disabling said first blocking means, normally effective second blocking means for preventing the completion of a two-way communication connection incident to answering of an incoming call to said station, and means controlled by operation of said second mechanism for disabling said second blocking means.

5. In a telephone system including a line, a station associated with said line, and means for routing a call over said line to said station; said station comprising coin-operated mechanism, normally effective blocking means for preventing the completion of a two-way communication connection incident to answering of a call to said station, and means controlled by operation of said mechanism for disabling said blocking means.

6. In a telephone system including a line, a station associated with said line, and means for routing a call and for projecting signal current over said line to said station; said station comprising a signal operated by the projection of signal current over said line, a device normally able to answer a call on said line, blocking means rendered effective in response to the projection of signal current over said line for disabling said device, and manually controlled means for rendering ineffective said blocking means, whereby said device is again enabled.

7. In a telephone system including a line, a station associated with said line, and means for routing a call and for projecting signal current over said line to said station; said station comprising a signal operated by the projection of signal current over said line, a device normally able to answer a call on said line, blocking means rendered effective in response to the projection of signal current over said line for disabling said device, and manually controlled means for arresting the projection of signal current over said line and for rendering ineffective said blocking means, whereby said device is again enabled.

8. In a telephone system including a line, a station associated with said line, and means for routing a call and for projecting signal current over said line to said station; said station comprising a signal operated by the projection of signal current over said line, a device normally able to answer a call on said line, blocking means rendered effective in response to the projection of signal current over said line for disabling said device, and manually controlled call registering mechanism for rendering ineffective said blocking means, whereby said device is again enabled.

9. In a telephone system including a line, a station associated with said line, and means for routing a call and for projecting signal current over said line to said station; said station comprising a signal operated by the projection of signal current over said line, a device normally able to answer a call on said line, blocking means rendered effective in response to the projection of signal current over said line for disabling said device, and coin controllel registering mechanism for rendering ineffective said blocking means, whereby said device is again enabled.

10. In a telephone system including a line, a station associated with said line, and means for routing a call and for projecting signal current over said line to said station; said station comprising a signal operated by the projection of signal current over said line, a device normally able to answer a call on said line, blocking means rendered effective in response to the projection of signal current over said line for disabling said device, and key-lock controlled call registering mechanism for rendering ineffective said blocking means, whereby said device is again enabled.

11. In a telephone system including a line, a station associated with said line, and means for routing a call and for projecting signal current over said line to said station; said station comprising a transmitter-receiver circuit, a hook-switch normally operative to connect said circuit to said line, a signal device and a relay both operated by the projection of signal current over said line, blocking means rendered effective in response to operation of said relay for rendering said hook-switch inoperative to connect said circuit to said line, and manually controlled means for rendering ineffective said blocking means, whereby said hook-switch is again rendered inoperative to connect said circuit to said line.

12. In a telephone system including a line, a station associated with said line, and means for routing a call and for projecting signal current over said line to said station; said station comprising a transmitter-receiver circuit, a hook-switch normally operative to connect said circuit to said line, a signal device and a relay both operated by the projection of signal current over said line, blocking means rendered effective in response to operation of said relay for rendering said hook-switch inoperative to connect said circuit to said line, and manually controlled call registering mechanism for rendering ineffective said blocking means, whereby said hook-switch is again rendered operative to connect said circuit to said line.

13. In a telephone system including a line, a station associated with said line, and means for routing a call and for projecting signal current over said line to said station, said station comprising a transmitter-receiver circuit, a hook-switch normally operative to connect said circuit to said line, a signal device and a relay both operated by the projection of signal current over said line, blocking means rendered effective in response to operation of said relay for rendering said hook-switch inoperative to connect said circuit to said line, and coin controlled call registering mechanism for rendering ineffective said blocking means, whereby said hook-switch is again rendered operative to connect said circuit to said line.

14. In a telephone system including a line, a station associated with said line, and means for routing a call and for projecting signal current over said line to said station, said station comprising a transmitter-receiver circuit, a hook-switch normally operative to connect said circuit to said line, a signal device and a relay both operated by the projection of signal current over said line, blocking means rendered effective in response to operation of said relay for rendering said hook-switch inoperative to connect said circuit to said line, and key-lock controlled call registering mechanism for rendering ineffective said blocking means, whereby said hook-switch is again rendered operative to connect said circuit to said line.

15. In a telephone system including a line, a station associated with said line, and means for routing a call and for projecting signal current over said line to said station; said station comprising a transmitter-receiver circuit, a path including a hook-switch and a pair of normally closed contacts for connecting said circuit to said line, whereby said hook-switch is normally operative to complete said path, a signal and a relay both operated by the projection of signal current over said line, means responsive to operation of said relay for opening said pair of contacts, whereby said hook-switch is rendered inoperative to complete said path, and manually controlled means for reclosing said pair of contacts, whereby said hook-switch is again rendered operative to complete said path.

16. In a telephone system including a line, a station associated with said line, and means for routing a call and for projecting signal current over said line to said station; said station comprising a transmitter-receiver circuit, a path including a hook-switch and a pair of normally closed contacts for connecting said circuit to said line, whereby said hook-switch is normally operative to complete said path, a signal and a relay both operated by the projection of signal current over said line, means responsive to operation of said relay for opening said pair of contacts, means for latching in open position said pair of contacts, whereby said hook-switch is rendered inoperative to complete said path, and manually controlled means for releasing said latching means, whereby said pair of contacts is reclosed in order again to render said hook-switch operative to complete said path.

17. In a telephone system including a line, a station associated with said line, and automatic switching apparatus; said switching apparatus comprising a switching mechanism having access to said line, means for operating said switching mechanism to select said line, means controlled by operation of said switching mechanism to select said line for routing a call and for projecting signal current thereover to said station, means responsive to answering of the call at said station for arresting the projection of signal current over said line, and means responsive to abandoning of the call prior to answering thereof at said station for arresting the projection of signal current over said line and for projecting a splash of unblock signal over said line and then for releasing said switching mechanism; said station comprising a signal operated by the projection of signal current over said line, a device normally able to answer a call on said line, blocking means rendered effective in response to the projection of signal current over said line for disabling said device, manually controlled means for rendering ineffective said blocking means, whereby said device is again enabled, and additional means responsive to the projection of a splash of unblock signal over said line for rendering ineffective said blocking means, whereby said device is again enabled.

18. In a telephone system including a line, a station associated with said line, and automatic switching apparatus; said switching apparatus comprising a switching mechanism having access to said line, means for operating said switching mechanism to select said line, means controlled by operation of said switching mechanism to select said line for routing a call thereover and for projecting signal current thereover to said station, means responsive to answering of the call at said station for arresting the projection of signal current over said line, and means responsive to abandoning of the call prior to answering thereof at said station for arresting the projection of signal current over said line and for projecting a splash of unblock signal over said line and then for releasing said switching mechanism; said station comprising a signal and a block relay both operated by the projection of signal current over said line, a device normally able to answer a call on said line, blocking means rendered effective in response to operation of said block relay for disabling said device, manually controlled means for rendering ineffective said blocking means, whereby said device is again enabled, an unblock relay operated by the projection of unblock current over said line, and means responsive to operation of said unblock relay for rendering ineffective said blocking means, whereby said device is again enabled.

CLARENCE E. LOMAX.
JOHN M. WILD.

REFERENCES CITED

The following references are of record in the file of this patent:

UNITED STATES PATENTS

| Number | Name | Date |
|---|---|---|
| 1,366,024 | Reubenstone | Jan. 18, 1921 |
| 1,792,579 | Edwards | Feb. 17, 1931 |
| 1,855,724 | Nelson | Apr. 26, 1932 |
| 2,137,409 | Martin et al. | Nov. 22, 1938 |
| 2,206,147 | Zimmerman | July 25, 1940 |
| 2,226,731 | Lomax | Dec. 31, 1940 |
| 2,248,575 | Lomax | July 8, 1941 |
| 2,301,363 | Bruck | Nov. 10, 1942 |
| 2,385,720 | Molnar | Sept. 25, 1945 |